US012638726B2

(12) United States Patent　　(10) Patent No.: US 12,638,726 B2
Ai et al.　　(45) Date of Patent:　May 26, 2026

(54) LIQUID CRYSTAL DISPLAY PANEL

(71) Applicant: WUHAN CHINA STAR OPTOELECTRONICS TECHNOLOGY CO., LTD., Wuhan (CN)

(72) Inventors: Fei Ai, Wuhan (CN); Shiyu Long, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 75 days.

(21) Appl. No.: 18/557,931

(22) PCT Filed: Jun. 28, 2023

(86) PCT No.: PCT/CN2023/103123
§ 371 (c)(1),
(2) Date: Oct. 28, 2023

(87) PCT Pub. No.: WO2024/041174
PCT Pub. Date: Feb. 29, 2024

(65) Prior Publication Data
US 2025/0123521 A1　　Apr. 17, 2025

(30) Foreign Application Priority Data
Aug. 25, 2022　(CN) .......................... 202211025312.9

(51) Int. Cl.
　G02F 1/1339　　(2006.01)
　G02F 1/1333　　(2006.01)
　G02F 1/1335　　(2006.01)

(52) U.S. Cl.
CPC .... G02F 1/13394 (2013.01); G02F 1/133357 (2021.01); G02F 1/133514 (2013.01); G02F 1/13396 (2021.01); G02F 1/13398 (2021.01)

(58) Field of Classification Search
CPC ............. G02F 1/13394; G02F 1/13398; G02F 1/13396; G02F 1/133357; G02F 1/133514; G02F 1/1339
See application file for complete search history.

(56) References Cited

U.S. PATENT DOCUMENTS

2007/0291216 A1* 12/2007 Chan ..................... G02F 1/1339
　　　　　　　　　　　　　　　　349/110
2008/0129946 A1* 6/2008 Chan ..................... G02F 1/1341
　　　　　　　　　　　　　　　　445/24
(Continued)

FOREIGN PATENT DOCUMENTS

CN　　101625486 A　　1/2010
CN　　101923255 A　　12/2010
(Continued)

OTHER PUBLICATIONS

PE2E English translation of CN107229152B (Year: 2020).*
(Continued)

*Primary Examiner* — David Y Chung
(74) *Attorney, Agent, or Firm* — PV IP PC; Peter Stecher; Wei Te Chung

(57)　　　　ABSTRACT

The embodiment of the present application discloses a liquid crystal display panel, the liquid crystal display panel includes a first substrate and a second substrate disposed opposite to each other. A frame sealant and a boss contacting each other are disposed in a frame sealant region, and the frame sealant at least partially overlaps the boss in a film thickness direction. A boss cooperating with the frame sealant to perform a sealing function is disposed in the frame sealant region. The boss reduces a volume of the frame
(Continued)

sealant and lowers a time required for curing the frame sealant to improve a productivity.

14 Claims, 6 Drawing Sheets

(56) References Cited

U.S. PATENT DOCUMENTS

| | | | | |
|---|---|---|---|---|
| 2011/0222014 | A1* | 9/2011 | Kim | G02F 1/13394 |
| | | | | 349/155 |
| 2015/0159089 | A1* | 6/2015 | Kawamura | C09K 19/44 |
| | | | | 252/299.63 |
| 2015/0303225 | A1* | 10/2015 | Jiang | H10D 86/441 |
| | | | | 438/158 |
| 2018/0107052 | A1* | 4/2018 | Jiang | G02F 1/133512 |
| 2018/0314097 | A1* | 11/2018 | Kiyota | G02F 1/13394 |

FOREIGN PATENT DOCUMENTS

| | | | |
|---|---|---|---|
| CN | 102902095 A | 1/2013 | |
| CN | 103353692 A | 10/2013 | |
| CN | 104122698 A | 10/2014 | |
| CN | 104865754 A | 8/2015 | |
| CN | 204832728 U | 12/2015 | |
| CN | 107229152 A | 10/2017 | |
| CN | 108646469 A | 10/2018 | |
| CN | 109360831 A | 2/2019 | |
| CN | 109445202 A | 3/2019 | |
| CN | 110426879 A | 11/2019 | |
| CN | 107229152 B * | 1/2020 | .......... G02F 1/1333 |
| CN | 111176027 A | 5/2020 | |
| CN | 113031350 A | 6/2021 | |
| CN | 115390320 A | 11/2022 | |
| KR | 20080049384 A | 6/2008 | |
| KR | 20170073878 A | 6/2017 | |

OTHER PUBLICATIONS

Chinese Office Action issued in corresponding Chinese Patent Application No. 202211025312.9 dated Dec. 20, 2023, pp. 1-8.
International Search Report in International application No. PCT/CN2023/103123, mailed on Oct. 12, 2023.
Written Opinion of the International Search Authority in International application No. PCT/CN2023/103123,mailed on Oct. 12, 2023.

* cited by examiner

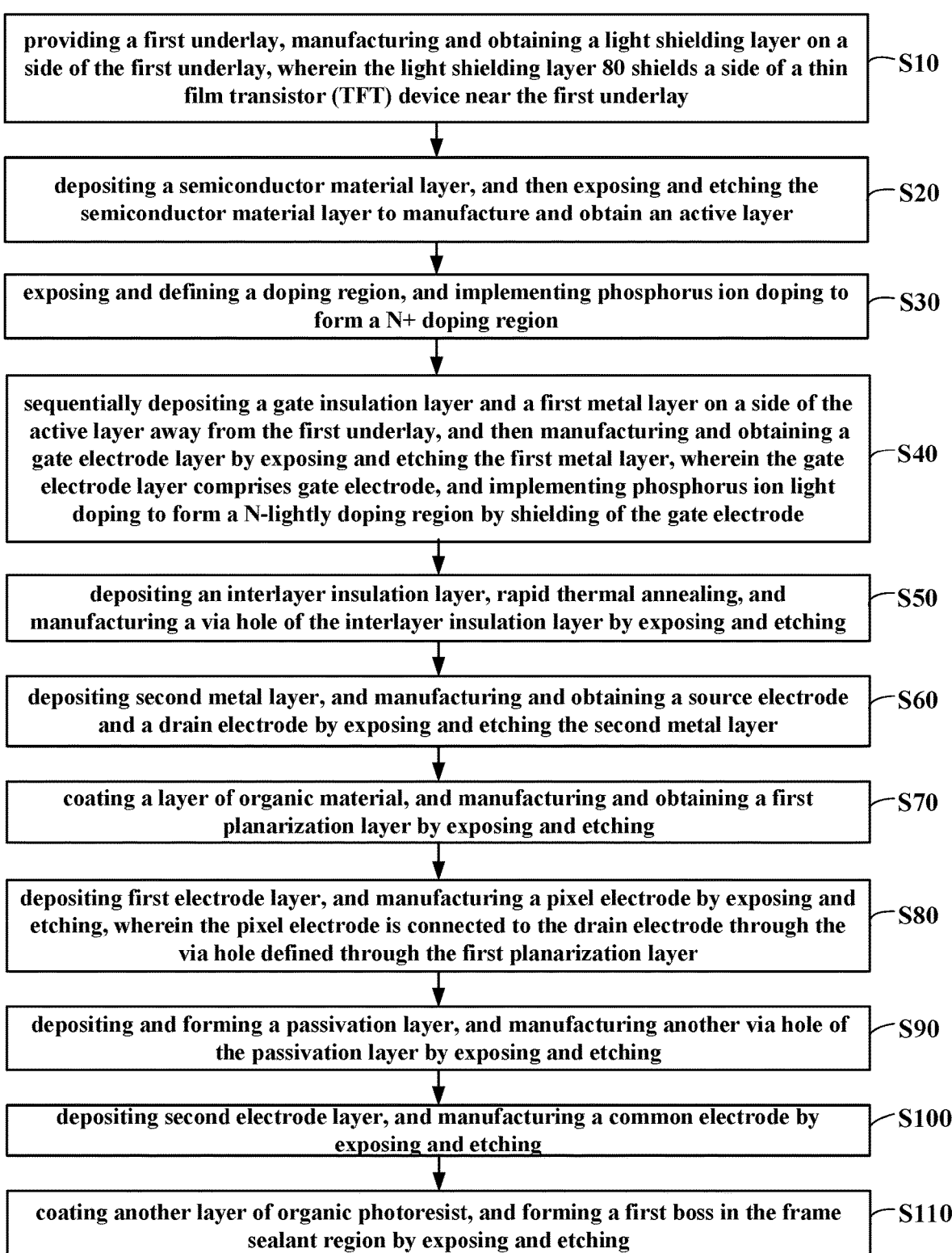

providing a first underlay, manufacturing and obtaining a light shielding layer on a side of the first underlay, wherein the light shielding layer 80 shields a side of a thin film transistor (TFT) device near the first underlay — S10 depositing a semiconductor material layer, and then exposing and etching the semiconductor material layer to manufacture and obtain an active layer — S20 exposing and defining a doping region, and implementing phosphorus ion doping to form a N+ doping region — S30 sequentially depositing a gate insulation layer and a first metal layer on a side of the active layer away from the first underlay, and then manufacturing and obtaining a gate electrode layer by exposing and etching the first metal layer, wherein the gate electrode layer comprises gate electrode, and implementing phosphorus ion light doping to form a N-lightly doping region by shielding of the gate electrode — S40 depositing an interlayer insulation layer, rapid thermal annealing, and manufacturing a via hole of the interlayer insulation layer by exposing and etching — S50 depositing second metal layer, and manufacturing and obtaining a source electrode and a drain electrode by exposing and etching the second metal layer — S60 coating a layer of organic material, and manufacturing and obtaining a first planarization layer by exposing and etching — S70 depositing first electrode layer, and manufacturing a pixel electrode by exposing and etching, wherein the pixel electrode is connected to the drain electrode through the via hole defined through the first planarization layer — S80 depositing and forming a passivation layer, and manufacturing another via hole of the passivation layer by exposing and etching — S90 depositing second electrode layer, and manufacturing a common electrode by exposing and etching — S100 coating another layer of organic photoresist, and forming a first boss in the frame sealant region by exposing and etching — S110

FIG. 4

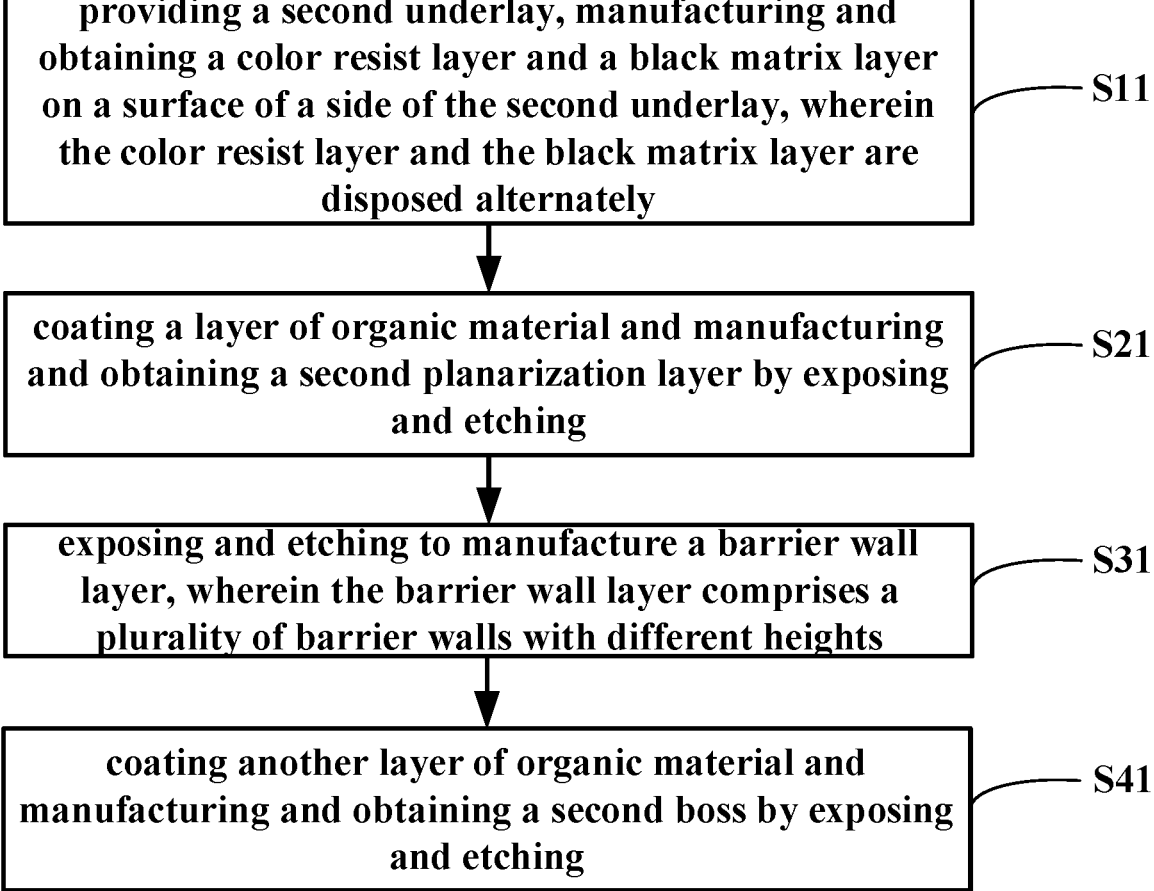

providing a second underlay, manufacturing and obtaining a color resist layer and a black matrix layer on a surface of a side of the second underlay, wherein the color resist layer and the black matrix layer are disposed alternately — S11 coating a layer of organic material and manufacturing and obtaining a second planarization layer by exposing and etching — S21 exposing and etching to manufacture a barrier wall layer, wherein the barrier wall layer comprises a plurality of barrier walls with different heights — S31 coating another layer of organic material and manufacturing and obtaining a second boss by exposing and etching — S41

LIQUID CRYSTAL DISPLAY PANEL

CROSS REFERENCE TO RELATED APPLICATIONS

This application claims the priority of International Application No. PCT/CN2023/103123, filed on Jun. 28, 2023, which claims the priority to Chinese Patent Application No. 202211025312.9, filed on Aug. 25, 2022. The entire disclosures of the above applications are incorporated herein by reference.

FIELD OF INVENTION

The present application relates to a field of liquid crystal display technologies, especially to a liquid crystal display panel.

BACKGROUND OF INVENTION

In a conventional liquid crystal display panel and its process, when aligning the array substrate and color filter substrate to form the liquid crystal cell, it is necessary to place a frame sealant between the array substrate and the color filter substrate. A thickness of the frame sealant typically equals the spacing between the array substrate and the color filter substrate. Due to the larger volume of the frame sealant, this results in a longer required light curing time for curing the frame sealant, which is not conducive to improving a productivity.

SUMMARY OF INVENTION

Technical Issue

Therefore, the conventional liquid crystal display panel has a technical issue of the long time for curing the frame sealant and a low productivity.

Technical Solution

The embodiment of the present application provides a liquid crystal display panel that can mitigate a technical issue of the long time for curing the frame sealant and a low productivity existing in the conventional liquid crystal display panel.

The embodiment of the present application provides a liquid crystal display panel, comprising a display region and a frame sealant region surrounding the display region, and further comprises:

a first substrate;

a second substrate disposed opposite to the first substrate, wherein the first substrate comprises a first surface facing a side of the second substrate, and the second substrate comprises a second surface facing a side of the first substrate;

wherein a sealing member is disposed between the frame sealant region, the first substrate and the second substrate, in a film thickness direction, an end of the sealing member is disposed on the first surface, another opposite end of the sealing member is disposed on the second surface, the sealing member is disposed linearly and continuously, the sealing member comprises a frame sealant and a boss contacting in a surface, and the boss and the frame sealant at least partially overlap each other in the film thickness direction.

Optionally, in some embodiments of the present application, the first substrate is an array substrate, the array substrate comprises a first underlay, a passivation layer disposed on a side of the first underlay facing the second substrate, the frame sealant contacts the boss, the boss comprises a first boss disposed on the array substrate, a height of the first boss relative to the first underlay is greater than a height of the passivation layer relative to the first underlay.

Optionally, in some embodiments of the present application, the first boss and the passivation layer are disposed integrally.

Optionally, in some embodiments of the present application, manufacturing material of the first boss is the same as manufacturing material of the passivation layer.

Optionally, in some embodiments of the present application, the array substrate further comprises a first planarization layer disposed on a side of the passivation layer facing the first underlay, and the first boss and the first planarization layer are disposed integrally.

Optionally, in some embodiments of the present application, manufacturing material of the first boss is the same as manufacturing material of the first planarization layer, and the manufacturing material of the first planarization layer is organic material.

Optionally, in some embodiments of the present application, the frame sealant is disposed on a surface of the first boss facing a side of the second substrate, the first boss covers the frame sealant in the film thickness direction.

Optionally, in some embodiments of the present application, in the film thickness direction, the first boss coincides with the frame sealant.

Optionally, in some embodiments of the present application, the second substrate is a color filter substrate, the color filter substrate comprises a second underlay and a second planarization layer disposed on a side of the second underlay facing the array substrate, the frame sealant contacts the boss, the boss comprises a second boss disposed on the color filter substrate, and a height of the second boss relative to the second underlay is greater than a height of the second planarization layer relative to the second underlay.

Optionally, in some embodiments of the present application, the color filter substrate further comprises a barrier wall layer disposed on a side of the second planarization layer away from the second underlay, and the barrier wall layer comprises a first barrier wall and a second barrier wall with different heights.

Optionally, in some embodiments of the present application, the second boss and the second planarization layer are disposed integrally.

Optionally, in some embodiments of the present application, manufacturing material of the second boss is the same as manufacturing material of the second planarization layer, and the manufacturing material of the second boss is organic material.

Optionally, in some embodiments of the present application, the frame sealant is disposed on a surface of a side of the second boss facing the first substrate, and the second boss covers the frame sealant along the film thickness direction.

Optionally, in some embodiments of the present application, in the film thickness direction, the second boss coincides with the frame sealant.

Optionally, in some embodiments of the present application, the first substrate is an array substrate, the second substrate is a color filter substrate, the boss comprises a first boss disposed on the first surface and a second boss disposed on the second surface, and the first boss overlaps the second boss in the film thickness direction.

Optionally, in some embodiments of the present application, the first boss, the frame sealant, and the second boss constitute a triple-layer stack structure, manufacturing material of the frame sealant is different from manufacturing material of the first boss.

Optionally, in some embodiments of the present application, the first boss, the frame sealant, and the second boss constitute a triple-layer stack structure, manufacturing material of the frame sealant is different from manufacturing material of the second boss.

Optionally, in some embodiments of the present application, the first boss is staggered from the second boss in the film thickness direction.

Optionally, in some embodiments of the present application, a recess is defined in a surface of a side of the frame sealant facing the boss, and the recess is engaged with the boss.

Optionally, in some embodiments of the present application, the boss faces the film thickness direction.

Advantages

The boss cooperating with the frame sealant to perform a sealing function is disposed in the frame sealant region such that the boss at least partially overlaps the frame sealant along the film thickness direction, which lowers a thickness of the frame sealant on an overlapping region to reduce a volume of the frame sealant to further reduce a time period required for curing the frame sealant and improve a productivity.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may also acquire other figures according to the appended figures without any creative effort.

FIG. 4 is a schematic flowchart of an array substrate manufacturing method provided by the present application;

FIG. 6 is a schematic flowchart of a color filter substrate manufacturing method provided by the present application.

Figure 1:
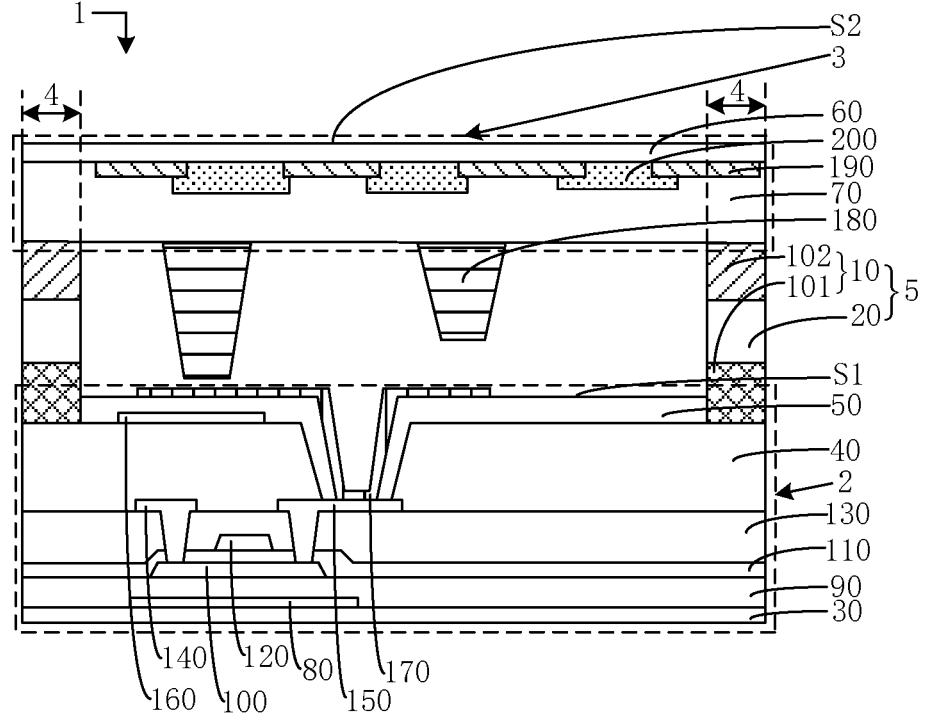
FIG. 1 is a first cross-sectional schematic view of a liquid crystal display panel provided by the present application.

Indication of reference characters of attached drawings:

| Reference character of the attached drawings | Part name | Reference character of the attached drawings | Part name |
| --- | --- | --- | --- |
| 1 | liquid crystal display panel | 2 | first substrate |
| 3 | second substrate | 4 | frame sealant region |
| S1 | first surface | S2 | second surface |
| 10 | boss | 20 | frame sealant |

-continued

| Reference character of the attached drawings | Part name | Reference character of the attached drawings | Part name |
| --- | --- | --- | --- |
| 30 | first underlay | 40 | first planarization layer |
| 50 | passivation layer | 60 | second underlay |
| 70 | second planarization layer | 80 | light shielding layer |
| 90 | buffer layer | 100 | active layer |
| 110 | gate insulation layer | 120 | gate electrode layer |
| 130 | interlayer insulation layer | 140 | source electrode |
| 150 | drain electrode | 160 | pixel electrode |
| 170 | common electrode | 180 | barrier wall |
| 190 | color resist layer | 200 | black matrix |
| 101 | first boss | 102 | second boss |
| 5 | sealing member | | |

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application. In addition, it should be understood that the specific embodiments described here are only used to illustrate and explain the present application, and are not used to limit the present application. In the present application, the used orientation terminologies such as "upper" and "lower", when not specified to the contrary explanation, usually refer to the upper and lower states of the device in actual use or working conditions, specifically according to the direction of the figures in the drawings. Furthermore, "inner" and "outer" refer to the outline of the device.

With reference to FIG. 1, a liquid crystal display panel 1 provided by the present application comprises a first substrate 2 and a second substrate 3. The second substrate 3 is disposed opposite to the first substrate 2. In the frame sealant region 4, a sealing member 5 is disposed between the first substrate 2 and the second substrate 3. The sealing member 5 comprises a frame sealant 20 and a boss 10 disposed to contact each other. The boss 10 and the frame sealant 20 at least partially overlap each other along a film thickness direction.

The first substrate 2 comprises a first surface S1. The second substrate 3 comprises a second surface S2. The first surface S1 is disposed on a side of the first substrate 2 facing the second substrate 3. the second surface S2 is disposed on a side of the second substrate 3 facing the first substrate 2.

The boss 10 can be disposed toward a film thickness direction.

The boss 10 can be disposed to contact the frame sealant 20.

The liquid crystal display panel 1 comprises a display region and a frame sealant region 4 surrounding the display region.

In the present embodiment, a boss 10 is disposed in the frame sealant region 4 such that the boss 10 at least partially overlap the frame sealant 20 along the film thickness direction, which lowers a thickness of the frame sealant 20 on an overlapping region to reduce a volume of the frame sealant 20 to further reduce a time period required for curing the frame sealant 20 and improve a productivity. Therefore, a technical issue of the long time for curing the frame sealant 20 and a low productivity existing in the liquid crystal display panel 1 is eased.

Technical solutions of the present application are described accompanying with specific embodiments.

In an embodiment, with reference to FIG. 1, the liquid crystal display panel 1 further comprises a light shielding layer 80, a buffer layer 90, an active layer 100, a gate insulation layer 110, a gate electrode layer 120, an interlayer insulation layer 130, a source electrode 140, a drain electrode 150, a common electrode 170, and a pixel electrode 160 disposed on a side of the first underlay 30 facing the second substrate 3.

A barrier wall 180 is disposed between the first substrate 2 and the second substrate 3.

The liquid crystal display panel 1 further comprises a color resist layer 190 and a black matrix 200 disposed on a side of the second underlay 60 facing the first substrate 2. The color resist layer 190 at least comprises a red color resist, a green color resist, and a blue color resist. The color resist layer 190 and the black matrix 200 are disposed alternately.

In an embodiment, the first substrate 2 is an array substrate, the array substrate comprises a first underlay 30 and a passivation layer 50 disposed on a side of the first underlay 30 facing the second substrate 3. The boss 10 comprises a first boss 101 disposed on the first surface S1. A height of the first boss 101 relative to the first underlay 30 is greater than a height of the passivation layer 50 relative to the first underlay 30.

A height of a top surface of a side of the first boss 101 away from the first underlay 30 relative to the first underlay 30 is greater than a height of a top surface of a side of the passivation layer 50 away from the first underlay 30 relative to the first underlay 30. When the first substrate 2 is an array substrate, a distance between the first substrate 2 and the second substrate 3 is approximately equal to a distance between the passivation layer 50 and the second substrate 3.

It can be understood that along a direction perpendicular to the first substrate 2, a thickness of the frame sealant 20 of a conventional technology is equal to the distance between the first substrate 2 and the second substrate 3. The present embodiment disposes the first boss 101 with the top surface of the first boss 101 higher than the top surface of the passivation layer 50 such that the thickness of the frame sealant 20 is reduced to shorten a curing time needed for the frame sealant 20 and improve productivity.

It should be noted that the curing time of the frame sealant 20 is relative to the volume of the frame sealant 20. Because in an extension direction along a length or a width of the first substrate 2, the length or the width is difficult to reduce, the present application considers reducing the thickness of the frame sealant 20 to reduce the volume of the frame sealant 20 to further reduce the curing time and improve productivity.

The present embodiment disposes the first boss 101 with a certain height such that the thickness of at least a part of the frame sealant 20 is comparatively lowered relative to a thickness of other part of the frame sealant 20 or the thickness of the frame sealant 20 of the conventional technology to reduce the volume of the frame sealant 20, shorten the curing time of the frame sealant 20, and improve productivity.

In an embodiment, the first boss 101 and the passivation layer 50 are disposed integrally.

Manufacturing material of the first boss 101 can be the same as manufacturing material of the passivation layer 50.

It can be understood that the first boss 101 and the passivation layer 50 can be manufactured and obtained in one process step. In particular, a halftone mask can be utilized to achieve the height of the first boss 101 greater than the height of the passivation layer 50. By using the original process of the passivation layer 50 without an additional mask, an integral structure of the first boss 101 and the passivation layer 50 can be manufactured and obtained.

In the present embodiment, integrally disposing the first boss 101 and the passivation layer 50 and manufacturing and obtaining the first boss 101 and the passivation layer 50 by the same mask in the same process step can achieve a cost lowering effect.

In an embodiment, the array substrate further comprises a first planarization layer 40 disposed on a side of the passivation layer 50 facing the first underlay 30. The first boss 101 and the first planarization layer 40 are disposed integrally.

Manufacturing material of the first boss 101 can be the same as manufacturing material of the first planarization layer 40. In particular, manufacturing material of the first planarization layer 40 is organic material.

It can be understood that a bonding force between the organic material and the frame sealant 20 is better and can improve a bonding strength between the frame sealant 20 and the first substrate 2 to prevent dislocation or separation of the frame sealant 20.

It can be understood that the first boss 101 and the passivation layer 50 disposed integrally can be manufactured by a halftone mask in one process step.

In the present embodiment, setting manufacturing material of the first boss 101 as organic material not only can manufacture the first boss 101 with the conventional first planarization layer 40 in the same layer, but also can improve a bonding force between the first substrate 2 and the frame sealant 20, which facilitates improvement of the productivity, prevents leakage of liquid crystals out from a side of the frame sealant 20 near the first substrate 2 resulting from dislocation or separation between the frame sealant 20 and the first substrate 2.

In an embodiment, the frame sealant 20 is disposed on a surface of a side of the first boss 101 facing the second substrate 3, and the first boss 101 the frame sealant 20 along the film thickness direction covers.

In the present embodiment, disposing the first boss 102 to cover the frame sealant 20 can further reduce a thickness of any part of the frame sealant 20 to better reduce the volume of the frame sealant 20 to further reduce the curing time of the frame sealant 20.

Figure 2:
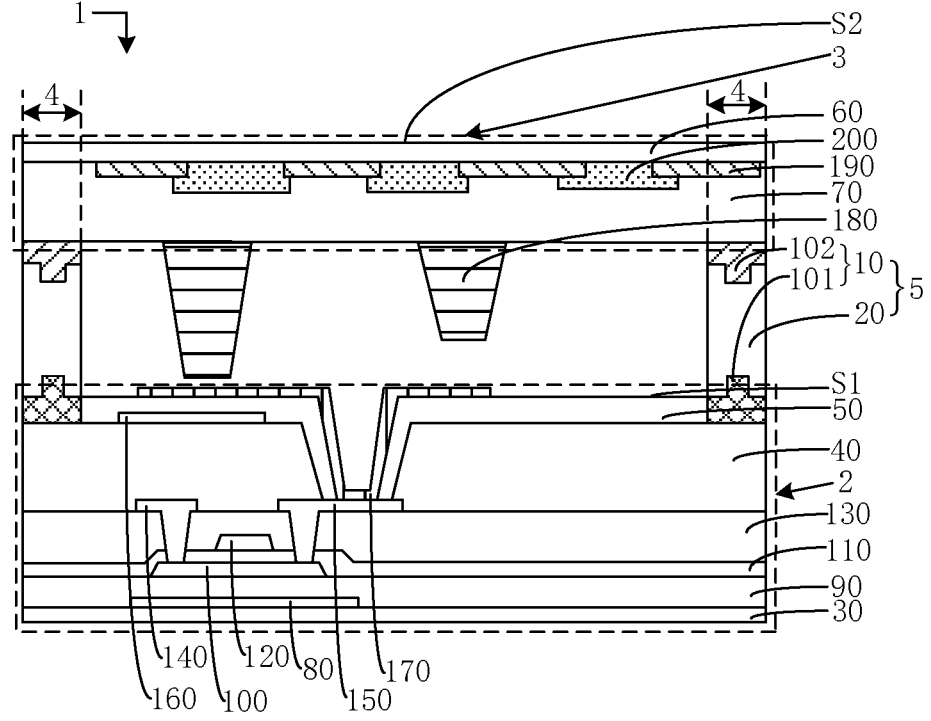
FIG. 2 is a second cross-sectional schematic view of the liquid crystal display panel provided by the present application.

In an embodiment, with reference to FIG. 2, the frame sealant 20 is disposed on a surface of a side of a second boss 102 facing the first substrate 2. Along the film thickness direction, the frame sealant 20 covers the second boss 102.

Along the film thickness direction, the first boss 101 can coincide with the frame sealant 20.

Along the film thickness direction, the first boss 101 can only partially coincide with the frame sealant 20.

It can be understood that the first boss 101 is only required to partially coincide with the frame sealant 20 along the film thickness direction to achieve reduction of the thickness of a part of the frame sealant 20 to reduce an entire volume of the frame sealant 20.

In the present embodiment, overlapping of the first boss 101 with the frame sealant 20 along the film thickness direction has several circumstances, the first boss 101 at least partially overlaps the frame sealant 20, and a top surface of the first boss 101 away from the first underlay 30 is higher than a top surface of the first substrate 2 such that the first boss 101 can reduce the thickness of a part of the frame sealant 20 to achieve reduction of the volume of the frame sealant 20 volume and improve productivity.

In an embodiment, the second substrate 3 is a color filter substrate, the color filter substrate comprises a second underlay 60 and a second planarization layer 70 disposed on a side of the second underlay 60 facing the array substrate. The boss 10 comprises a second boss 102 disposed on the second surface S2. A height of the second boss 102 relative to the second underlay 60 height is greater than a height of the second planarization layer 70 relative to the second underlay 60.

A height of a top surface of a side of the second boss 102 away from the second underlay 60 relative to the second underlay 60 is greater than a height of a top surface of a side of the second planarization layer 70 away from the second underlay 60 relative to the second underlay 60. When the second substrate 3 is a color filter substrate, a distance between the second substrate 3 and the first substrate 2 is approximately equal to a distance between the second planarization layer 70 and the first substrate 2.

It can be understood that along a direction perpendicular to the second substrate 3, in a conventional technology, a thickness of the frame sealant 20 is equal to a distance between the second substrate 3 and the first substrate 2. The present embodiment disposes the second boss 102 with the top surface of the second boss 102 higher than the top surface of the passivation layer 50 such that the thickness of the frame sealant 20 is reduced to shorten a curing time needed for the frame sealant 20 and improve productivity.

It should be noted that the curing time of the frame sealant 20 is relative to the volume of the frame sealant 20. Because in an extension direction along a length or a width of the second substrate 3, the length or the width is difficult to reduce, the present application considers reducing the thickness of the frame sealant 20 to reduce the volume of the frame sealant 20 to further reduce the curing time and improve productivity.

The present embodiment disposes the second boss 102 with a certain height such that the thickness of at least a part of the frame sealant 20 is comparatively lowered relative to a thickness of other part of the frame sealant 20 or the thickness of the frame sealant 20 of the conventional technology to reduce the volume of the frame sealant 20, shorten the curing time of the frame sealant 20, and improve productivity.

In an embodiment, the second boss 102 and the second planarization layer 70 are disposed integrally.

Manufacturing material of the second boss 102 is the same as manufacturing material of the second planarization layer 70.

It can be understood that the second boss 102 can be organic material to enhance a bonding force between the second boss 102 and the frame sealant 20.

In the present embodiment, the second boss 102 made of organic material, improves a bonding force between the second boss 102 and the frame sealant 20 to prevent dislocation or separation between the frame sealant 20 and the second substrate 3.

In an embodiment, the frame sealant 20 is disposed on a surface of a side of the second boss 102 facing the first substrate 2. Along the film thickness direction, the second boss 102 covers the frame sealant 20.

In the present embodiment, the second boss 102 covering the frame sealant 20 can further reduce a thickness of any part of the frame sealant 20 to better reduce a volume of the frame sealant 20 to further reduce a curing time of the frame sealant 20.

In an embodiment, with reference to FIG. 2, the frame sealant 20 is disposed on a surface of a side of the second boss 102 facing the first substrate 2. Along the film thickness direction, the frame sealant 20 covers the second boss 102.

Along the film thickness direction, the second boss 102 can coincide with the frame sealant 20.

Along the film thickness direction, the second boss 102 can only partially coincide with the frame sealant 20.

It can be understood that the second boss 102 is only required to partially coincide with the frame sealant 20 along the film thickness direction to achieve reduction of the thickness of a part of the frame sealant 20 to further reduce an entire volume of the frame sealant 20.

In the present embodiment, overlapping of the second boss 102 with the frame sealant 20 along the film thickness direction has several circumstances, the second boss 102 at least partially overlaps the frame sealant 20, and a top surface of the second boss 102 away from the second underlay 60 is higher than a top surface of the second substrate 3 such that the second boss 102 can reduce the thickness of a part of the frame sealant 20 to achieve reduction of the volume of the frame sealant 20 volume and improve productivity.

In an embodiment, the first substrate 2 is an array substrate, and the second substrate 3 is a color filter substrate. The boss 10 comprises a first boss 101 disposed on the first surface S1 and a second boss 102 disposed on the second surface S2. The first boss 101 overlaps the second boss 102 along the film thickness direction.

The first boss 101 can coincide with the second boss 102 along the film thickness direction.

In another embodiment, the first boss 101 and the second boss 102 are staggered along the film thickness direction.

In an embodiment, the first boss 101, the frame sealant 20, the second boss 102 form a triple-layer stack structure. Manufacturing material of the frame sealant 20 is different from manufacturing material of the first boss 101. Alternatively, the manufacturing material of the frame sealant 20 is different from manufacturing material of the second boss 102.

The manufacturing material of the first boss 101 can be the same as the manufacturing material of the first planarization layer 40. It can be understood that the first planarization layer 40 is organic material and can enhance a bonding force between the first boss 101 and the frame sealant 20.

The manufacturing material of the second boss 102 can be the same as the manufacturing material of the second planarization layer 70. It can be understood that the second planarization layer 70 is organic material and can enhance a bonding force between the second boss 102 and the frame sealant 20.

It should be noted that the first boss 101, the second boss 102 requires no ultraviolet curing. Disposing the first boss 101 and/or the second boss 102 on the frame sealant 20 along the film thickness direction in advance can reduce the volume of the frame sealant 20 to be cured to lower the time for curing the frame sealant 20 and improve productivity.

In the present embodiment, limiting the manufacturing material of the first boss 101 and the second boss 102 can further improve a bonding force between the first boss 101 and the second boss 102 and the frame sealant 20 to prevent separation of layers among the frame sealant 20, the first boss 101, and the second boss 102.

In an embodiment, a recess is defined in a surface of a side of the frame sealant 20 facing the boss 10. The recess is engaged with the boss 10.

It can be understood that the recess defined in the frame sealant 20 and engaged with the boss 10 can improve a contact area between the frame sealant 20 and the first substrate 2 and/or the second substrate 3 such that a bonding strength between the frame sealant 20 and the first substrate 2 and/or the second substrate 3 is enhanced.

In the present embodiment, by the boss 10 engaged with the frame sealant 20, a contact area between the frame sealant 20 and the first substrate 2 and/or the second substrate 3 is improved.

In an embodiment, the first substrate 2 can be a color filter substrate, and the second substrate 3 can be an array substrate.

Figure 3:
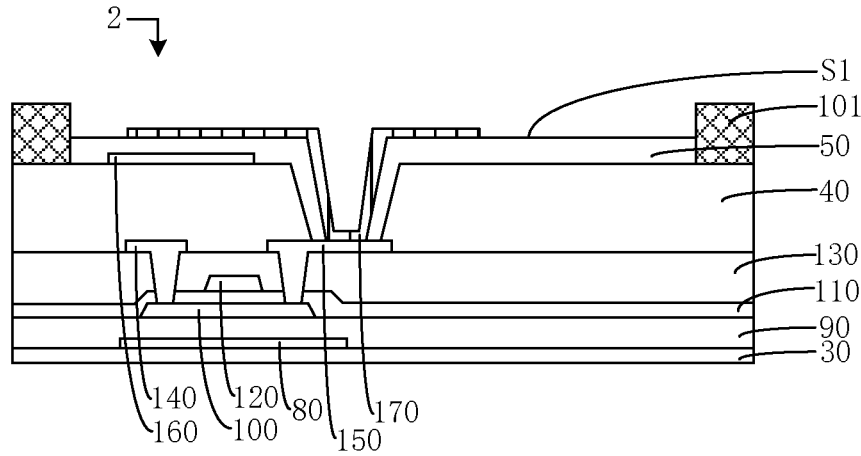
FIG. 3 is a cross-sectional schematic view of an array substrate provided by the present application.

With reference to FIG. 3, FIG. 3 is a schematic structural view of the array substrate. Furthermore, with reference to FIG. 4, a process for the array substrate is as follows:

a step S10: providing a first underlay 30, manufacturing and obtaining a light shielding layer 80 on a side of the first underlay 30, wherein the light shielding layer 80 shields a side of a thin film transistor (TFT) device near the first underlay 30;

a step S20: depositing a semiconductor material layer, and then exposing and etching the semiconductor material layer to manufacture and obtain an active layer 100;

a step S30: exposing and defining a doping region, and implementing phosphorus ion doping to form a N+ doping region;

a step S40: sequentially depositing a gate insulation layer 110 and a first metal layer on a side of the active layer 100 away from the first underlay 30, and then manufacturing and obtaining a gate electrode layer 120 by exposing and etching the first metal layer, wherein the gate electrode layer 120 comprises gate electrode, and implementing phosphorus ion light doping to form a N-lightly doping region by shielding of the gate electrode;

a step S50: depositing an interlayer insulation layer 130, rapid thermal annealing, and manufacturing a via hole of the interlayer insulation layer 130 by exposing and etching;

a step S60: depositing second metal layer, and manufacturing and obtaining a source electrode 140 and a drain electrode 150 by exposing and etching the second metal layer;

a step S70: coating a layer of organic material, and manufacturing and obtaining a first planarization layer 40 by exposing and etching;

a step S80: depositing first electrode layer, and manufacturing a pixel electrode 160 by exposing and etching, wherein the pixel electrode 160 is connected to the drain electrode 150 through the via hole defined through the first planarization layer 40;

a step S90: depositing and forming a passivation layer 50, and manufacturing another via hole of the passivation layer 50 by exposing and etching;

a step S100: depositing second electrode layer, and manufacturing a common electrode 170 by exposing and etching; and a step S110: coating another layer of organic photoresist, and forming a first boss 101 in the frame sealant region 4 by exposing and etching.

The step S110 can be completed simultaneously with the step S70, namely, whiling manufacturing and obtaining the first planarization layer 40, the first boss 101 is manufactured and obtained. The first planarization layer 40 and the first boss 101 are formed integrally.

Figure 5:
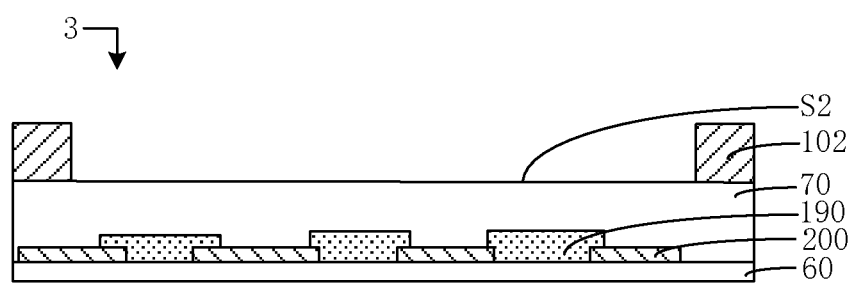
FIG. 5 is a cross-sectional schematic view of a color filter substrate provided by the present application.

With reference to FIG. 5, FIG. is a schematic structural view of the color filter substrate. Furthermore, with reference to FIG. 6, a process for the color filter substrate is as follows:

a step S11: providing a second underlay 60, manufacturing and obtaining a color resist layer 190 and a black matrix 200 layer on a surface of a side of the second underlay 60, wherein the color resist layer 190 and the black matrix 200 layer are disposed alternately;

a step S21: coating a layer of organic material and manufacturing and obtaining a second planarization layer 70 by exposing and etching;

a step S31: exposing and etching to manufacture a barrier wall layer, wherein the barrier wall layer comprises a plurality of barrier walls 180 with different heights; and a step S41: coating another layer of organic material and manufacturing and obtaining a second boss 102 by exposing and etching.

It should be noted that the barrier wall layer can comprise a first barrier wall 180 and a second barrier wall 180 with different heights. A height of the first barrier wall 180 is greater than a height of the second barrier wall 180, the second barrier wall 180 is for auxiliarily supporting the barrier wall 180 and performs an auxiliarily supporting function when the first barrier wall is compressed, which improves a supporting effect of the barrier wall 180.

The present application also provides a liquid crystal display module and a liquid crystal display device, and both the liquid crystal display module and the liquid crystal display device comprise the above liquid crystal display panel, no repeated description is here.

The liquid crystal display panel provided by the present embodiment comprises a first substrate and a second substrate. The second substrate and the first substrate are disposed opposite to each other. The second substrate comprises a second surface. A sealing member is disposed between the frame sealant region, the first substrate and the second substrate. The sealing member comprises a frame sealant and a boss contacting each other. The boss at least partially overlaps the frame sealant along the film thickness direction. The boss cooperating with the frame sealant to perform a sealing function in the frame sealant region. By disposing the boss, a volume of the frame sealant is reduced such that a time for curing the frame sealant is lowered and a productivity is improved, which mitigates the technical issue of the long time required for curing the frame sealant and low productivity existing in the conventional liquid crystal display panel.

In the above-mentioned embodiments, the descriptions of the various embodiments are focused. For the details of the embodiments not described, reference may be made to the related descriptions of the other embodiments.

The liquid crystal display panel provided by the embodiment of the present application are described in detail as above. In the specification, the specific examples are used to explain the principle and embodiment of the present application. The above description of the embodiments is only used to help understand the method of the present application and its spiritual idea. Meanwhile, for those skilled in the art, according to the present idea of invention, changes will be made in specific embodiment and application. In summary, the contents of this specification should not be construed as limiting the present application.

What is claimed is:

1. A liquid crystal display panel, wherein the liquid crystal display panel comprises a display region and a frame sealant region surrounding the display region, and further comprises:

a first substrate;

a second substrate disposed opposite to the first substrate, wherein the first substrate comprises a first surface facing a side of the second substrate, and the second substrate comprises a second surface facing a side of the first substrate;

wherein a sealing member is disposed between the frame sealant region, the first substrate and the second substrate, in a film thickness direction, an end of the sealing member is disposed on the first surface, another opposite end of the sealing member is disposed on the second surface, the sealing member is disposed linearly and continuously, the sealing member comprises a frame sealant and a boss in surface contact with each other, and the boss and the frame sealant at least partially overlap each other in the film thickness direction;

wherein the first substrate is an array substrate, the array substrate comprises a first underlay, a passivation layer disposed on a side of the first underlay facing the second substrate, the frame sealant contacts the boss, the boss comprises a first boss disposed on the array substrate and laterally abutting the passivation layer, a height of the first boss relative to the first underlay is greater than a height of the passivation layer relative to the first underlay;

the second substrate is a color filter substrate, the color filter substrate comprises a second underlay and a second planarization layer disposed on a side of the second underlay facing the array substrate, the frame sealant contacts the boss, the boss comprises a second boss disposed on the color filter substrate;

wherein the array substrate further comprises a first planarization layer disposed on a side of the passivation layer facing the first underlay, and the first boss and the first planarization layer are disposed integrally;

wherein manufacturing material of the first boss and manufacturing material of the first planarization layer are the same organic material;

wherein the second boss and the second planarization layer are disposed integrally;

wherein manufacturing material of the second boss and manufacturing material of the second planarization layer are the same organic material;

wherein the first boss and the passivation layer are disposed integrally.

2. The liquid crystal display panel according to claim 1, wherein manufacturing material of the first boss is the same as manufacturing material of the passivation layer.

3. The liquid crystal display panel according to claim 1, wherein the frame sealant is disposed on a surface of the first boss facing a side of the second substrate, the first boss covers the frame sealant in the film thickness direction.

4. The liquid crystal display panel according to claim 3, wherein in the film thickness direction, the first boss coincides with the frame sealant.

5. The liquid crystal display panel according to claim 1, wherein a height of the second boss relative to the second underlay is greater than a height of the second planarization layer relative to the second underlay.

6. The liquid crystal display panel according to claim 5, wherein the color filter substrate further comprises a barrier wall layer disposed on a side of the second planarization layer away from the second underlay, and the barrier wall layer comprises a first barrier wall and a second barrier wall with different heights.

7. The liquid crystal display panel according to claim 5, wherein the frame sealant is disposed on a surface of a side of the second boss facing the first substrate, and the second boss covers the frame sealant along the film thickness direction.

8. The liquid crystal display panel according to claim 5, wherein in the film thickness direction, the second boss coincides with the frame sealant.

9. The liquid crystal display panel according to claim 1, wherein the first substrate is an array substrate, the second substrate is a color filter substrate, the boss comprises a first boss disposed on the first surface and a second boss disposed on the second surface, and the first boss overlaps the second boss in the film thickness direction.

10. The liquid crystal display panel according to claim 9, wherein the first boss, the frame sealant, and the second boss constitute a triple-layer stack structure, manufacturing material of the frame sealant is different from manufacturing material of the first boss.

11. The liquid crystal display panel according to claim 9, wherein the first boss, the frame sealant, and the second boss constitute a triple-layer stack structure, manufacturing material of the frame sealant is different from manufacturing material of the second boss.

12. The liquid crystal display panel according to claim 9, wherein the first boss is staggered from the second boss in the film thickness direction.

13. The liquid crystal display panel according to claim 1, wherein a recess is defined in a surface of a side of the frame sealant facing the boss, and the recess is engaged with the boss.

14. The liquid crystal display panel according to claim 1, wherein the boss faces the film thickness direction.

* * * * *